US006842848B2

(12) United States Patent
Hokenek et al.

(10) Patent No.: US 6,842,848 B2
(45) Date of Patent: Jan. 11, 2005

(54) METHOD AND APPARATUS FOR TOKEN TRIGGERED MULTITHREADING

(75) Inventors: Erdem Hokenek, Yorktown Heights, NY (US); Mayan Moudgill, White Plains, NY (US); C. John Glossner, Carmel, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 142 days.

(21) Appl. No.: 10/269,245

(22) Filed: Oct. 11, 2002

(65) Prior Publication Data

US 2004/0073781 A1 Apr. 15, 2004

(51) Int. Cl.⁷ .............................. G06F 9/38; G06F 9/54; G06F 9/312
(52) U.S. Cl. ....................... 712/215; 712/219; 712/248; 712/221; 712/228; 719/332; 718/108
(58) Field of Search ................................ 712/215, 219, 712/221, 228, 248, 23, 24, 245; 719/332; 718/108

(56) References Cited

U.S. PATENT DOCUMENTS

| | | | | |
|---|---|---|---|---|
| 5,339,415 A | * | 8/1994 | Strout et al. ................. | 718/102 |
| 5,404,469 A | * | 4/1995 | Chung et al. ................ | 712/215 |
| 5,613,114 A | * | 3/1997 | Anderson et al. ........... | 718/108 |
| 5,649,135 A | | 7/1997 | Pechanek et al. | |
| 5,659,785 A | | 8/1997 | Pechanek et al. | |
| 5,682,491 A | | 10/1997 | Pechanek et al. | |
| 5,742,840 A | * | 4/1998 | Hansen et al. ............... | 712/210 |
| 6,079,010 A | | 6/2000 | D'Arcy et al. | |
| 6,128,720 A | | 10/2000 | Pechanek et al. | |
| 6,151,683 A | * | 11/2000 | Wookey ........................ | 714/2 |
| 6,230,251 B1 | | 5/2001 | Batten et al. | |
| 6,256,725 B1 | | 7/2001 | Batten et al. | |
| 6,260,189 B1 | | 7/2001 | Batten et al. | |
| 6,269,437 B1 | | 7/2001 | Batten et al. | |
| 6,282,585 B1 | | 8/2001 | Batten et al. | |
| 6,317,821 B1 | | 11/2001 | Batten et al. | |
| 6,341,338 B1 | * | 1/2002 | Dennie ........................ | 711/147 |

OTHER PUBLICATIONS

C. J. Glossner, "The Delft–Java Engine," Doctoral Thesis, Delft University of Technology, Netherlands, Nov. 5, 2001.
"Basic Features of the HEP Supercomputer," –ee.eng.hawaii.edu/~nava/HEP/introduction.html, pp. 1–2.
"The MOVE Concept," ce.et.tudelft.nl/MOVE/section3.2.html, pp. 1–2.
"Simultaneous Multithreading Project," .cs.washington.edu/research/ smt/index.html, pp. 1–7.
"Introduction to Multithreading, Superthreading and Hyperthreading," arstechnica.com/paedia/h/hyperthreading/hyperthreading–1.html, pp. 1–5.

* cited by examiner

Primary Examiner—Daniel H. Pan
(74) Attorney, Agent, or Firm—Ryan, Mason & Lewis, LLP

(57) ABSTRACT

Techniques for token triggered multithreading in a multi-threaded processor are disclosed. An instruction issuance sequence for a plurality of threads of the multithreaded processor is controlled by associating with each of the threads at least one register which stores a value identifying a next thread to be permitted to issue one or more instructions, and utilizing the stored value to control the instruction issuance sequence. For example, each of a plurality of hardware thread units of the multithreaded processor may include a corresponding local register updatable by that hardware thread unit, with the local register for a given one of the hardware thread units storing a value identifying the next thread to be permitted to issue one or more instructions after the given hardware thread unit has issued one or more instructions. A global register arrangement may also or alternatively be used. The processor may be configured so as to permit the instruction issuance sequence to correspond to an arbitrary alternating even-odd sequence of threads, without introducing blocking conditions leading to thread stalls.

16 Claims, 5 Drawing Sheets

| | INST DEC | RF READ | AGEN | XFER | INT EXT | MEM 0 | MEM 1 | MEM 2 | WB |
|---|---|---|---|---|---|---|---|---|---|
| Ld/St | INST DEC | RF READ | AGEN | XFER | INT EXT | MEM 0 | MEM 1 | MEM 2 | WB |
| ALU | INST DEC | RF READ | EXEC1 | EXEC2 | XFER | WB | | | |
| I_Mul | INST DEC | RF READ | EXEC1 | EXEC2 | EXEC3 | XFER | WB | | |
| V_Mul | INST DEC | RF READ | MPY1 | MPY2 | ADD1 | ADD2 | XFER | WB | |

| | | | | | | | | | |
|---|---|---|---|---|---|---|---|---|---|
| Ld/St | INST DEC | RF READ | AGEN | XFER | INT EXT | MEM 0 | MEM 1 | MEM 2 | WB |
| ALU | INST DEC | RF READ | EXEC1 | EXEC2 | XFER | WB | | | |
| I_Mul | INST DEC | RF READ | EXEC1 | EXEC2 | EXEC3 | XFER | WB | | |
| V_Mul | INST DEC | RF READ | MPY1 | MPY2 | ADD1 | ADD2 | XFER | WB | |

FIG. 6

| THREAD | EACH THREAD ISSUES LD & V_MUL PER CYCLE | |
|---|---|---|
| 1 | D R A X I M M M W̄ᵉ | e |
|   | D R M M A A X W | |
| 2 |   D R A X I M M M W | o |
|   |   D R M M A A X W̄ᵒ | |
| 3 |     D R A X I M M M W | e |
|   |     D R M M A A X W | |
| 4 |       D R A X I M M M W | o |
|   |       D R M M A A X W | |
| 1 |         D R A X I M M M W | e |
|   |         D R M M A A X W | |
| 2 |           D R A X I M M M W | o |
|   |           D R M M A A X W | |
| 3 |             D R A X I M M M W | e |
|   |             D R M M A A X W | |
| 4 |               D R A X I M M M W | o |
|   |               D R M M A A X W | |
| 1 |                 D R A X I M M M W | e |
|   |                 D R M M A A X W | |
| 2 |                   D R A X I M M M W | o |
|   |                   D R M M A A X W | |
| 3 |                     D R A X I M M M W | e |
|   |                     D R M M A A X W | |
| 4 |                       D R A X I M M M W | o |
|   |                       D R M M A A X W | |

METHOD AND APPARATUS FOR TOKEN TRIGGERED MULTITHREADING

RELATED APPLICATION(S)

The present invention is related to the inventions described in U.S. patent application Ser. No. 10/269,247, entitled "Method and Apparatus for Thread-Based Memory Access in a Multithreaded Processor," Ser. No. 10/269,372, entitled "Multithreaded Processor With Efficient Processing For Convergence Device Applications," and Ser. No. 10/269,373, entitled "Method and Apparatus for Register File Port Reduction in a Multithreaded Processor," all of which are filed concurrently herewith and incorporated by reference herein.

FIELD OF THE INVENTION

The present invention relates generally to the field of digital data processors, and more particularly to threading techniques for use in a multithreaded processor.

BACKGROUND OF THE INVENTION

Multithreaded processors are processors that support simultaneous execution of multiple distinct instruction sequences or "threads." Conventional threading techniques are described in, for example, M. J. Flynn, "Computer Architecture: Pipelined and Parallel Processor Design," Jones and Bartlett Publishers, Boston, Mass., 1995, and G. A. Blaauw and Frederick P. Brooks, "Computer Architecture: Concepts and Evolution," Addison-Wesley, Reading, Mass., 1997, both of which are incorporated by reference herein.

By way of example, a technique known as "barrel multithreading" allows each thread to issue an instruction in accordance with a specified fixed numeric sequence. For example, a processor with four threads, denoted Thread 0, Thread 1, Thread 2 and Thread 3, in accordance with barrel multithreading would allow the threads to issue instructions in the fixed numeric order Thread 0, Thread 1, Thread 2, Thread 3, Thread 0 and so on.

A problem with barrel multithreading and other existing threading techniques is that such techniques are generally not configured to permit arbitrary sequencing of thread instruction issuance, or if so configured require an excessive amount of hardware for their implementation.

Existing techniques are therefore unduly inflexible, and may place undesirable limitations on processor concurrency. Moreover, these techniques can contribute to blocking conditions and thus thread stalling, which adversely impacts processor performance.

A need therefore exists for improved threading techniques for use in a multithreaded processor.

SUMMARY OF THE INVENTION

The present invention provides token triggered threading techniques for a multithreaded processor.

In accordance with one aspect of the invention, an instruction issuance sequence for a plurality of threads of the multithreaded processor is controlled by associating with each of the threads at least one register which stores a value identifying a next thread to be permitted to issue one or more instructions, and then utilizing the stored value to control the instruction issuance sequence.

By way of example, in an illustrative embodiment of the invention, each of a plurality of hardware thread units or "contexts" of the multithreaded processor may include a corresponding local next thread identifier register updatable by that hardware thread unit, with the local register for a given one of the hardware thread units storing a value identifying the next thread to be permitted to issue one or more instructions after the given hardware thread unit has issued one or more instructions.

A global register arrangement may also or alternatively be used. More particularly, there may be associated with the threads at least one global register accessible to each of the threads, with the contents of the global register after instruction issuance by a given one of the threads identifying another of the threads to be permitted to issue one or more instructions in accordance with the instruction issuance sequence.

Advantageously, a multithreaded processor in accordance with the invention may be configured so as to permit the instruction issuance sequence to correspond, for example, to an arbitrary alternating even-odd sequence of threads, or other arbitrary sequence, without introducing blocking conditions leading to thread stalls.

BRIEF DESCRIPTION OF THE DRAWINGS

FIG. 6 shows an example multiple issue pipeline in which each of the threads of the FIG. 2 processor issues two instructions per cycle.

DETAILED DESCRIPTION OF THE INVENTION

The present invention will be illustrated herein as implemented in an example multithreaded processor. It should be understood, however, that the invention does not require the use of the particular multithreaded processor configuration of the illustrative embodiment, and is more generally suitable for use in any multithreaded processor application in which it is desirable to provide improved performance through the use of token triggered multithreading in conjunction with instruction pipelining.

An example processing system 100 which implements a token triggered threading technique in accordance with the invention will be described in conjunction with FIGS. 1 and 2.

Figure 1:
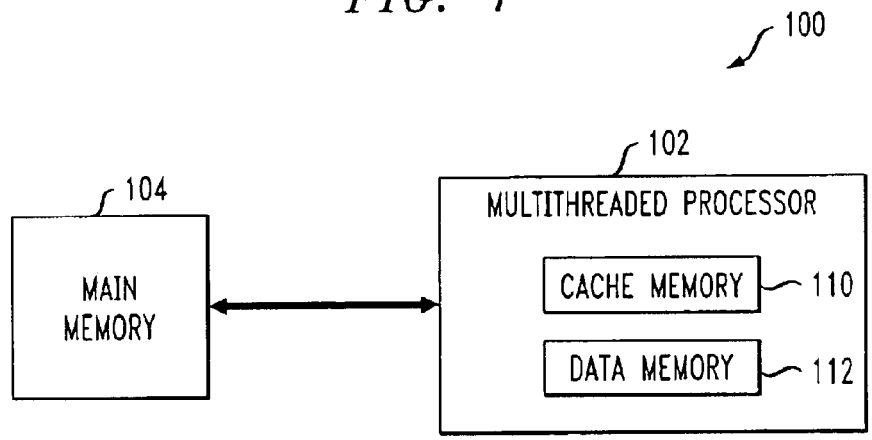
FIG. 1 is a block diagram of an example processing system in which the invention is implemented.

FIG. 1 shows the processing system 100 as including a multithreaded processor 102 coupled to a main memory 104.

The multithreaded processor 102 includes a multithreaded cache memory 110 and a multithreaded data memory 112.

Figure 2:
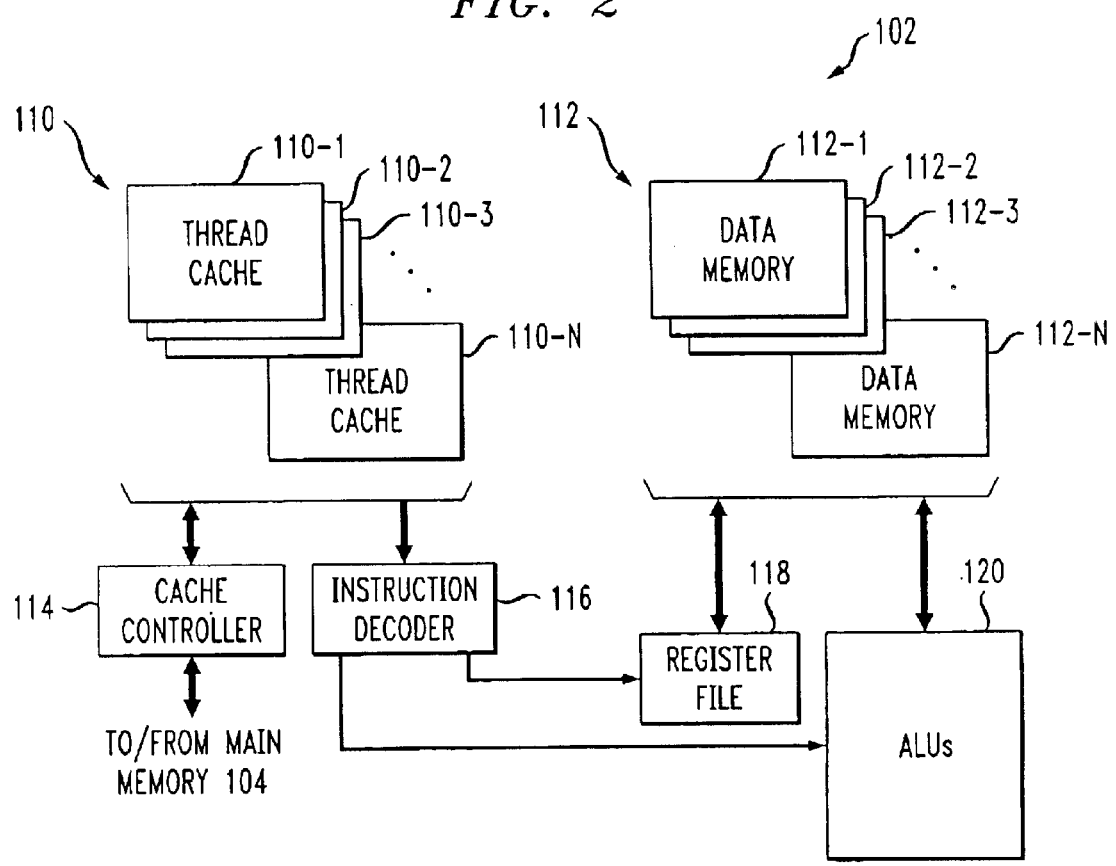
FIG. 2 is a more detailed block diagram of an illustrative embodiment of a multithreaded processor of the FIG. 1 processing system.

FIG. 2 shows a more detailed view of one possible implementation of the multithreaded processor 102. In this embodiment, the multithreaded processor 102 includes the multithreaded cache memory 110, the data memory 112, a cache controller 114, an instruction decoder 116, a register file 118, and a set of arithmetic logic units (ALUs) 120. The multithreaded cache memory 110 is also referred to herein as a multithreaded cache.

It should be noted that the particular arrangements shown in FIGS. 1 and 2 are simplified for clarity of illustration, and additional or alternative elements not explicitly shown may be included, as will be apparent to those skilled in the art.

The multithreaded cache 110 includes a plurality of thread caches 110-1, 110-2, . . . 110-N, where N generally denotes the number of threads supported by the multithreaded processor 102. Each thread thus has a corresponding thread cache associated therewith in the multithreaded cache 110. Similarly, the data memory 112 includes N distinct data memory instances, denoted data memories 112-1, 112-2, . . . 112-N as shown.

Each of the thread caches in the multithreaded cache 110 may comprise a memory array having one or more sets of memory locations. A given thread cache may further comprise a thread identifier register for storing an associated thread identifier, as will be described in greater detail below in conjunction with FIG. 7.

The multithreaded cache 110 interfaces with the main memory 104 via the cache controller 114. The cache controller 114 ensures that the appropriate instructions from main memory 104 are loaded into the multithreaded cache 110. The cache controller 114 in this illustrative embodiment, operating in conjunction with logic circuitry or other processing elements associated with the individual thread caches 110-1, 110-2, . . . 110-N, implements at least a portion of an address mapping technique, such as fully associative mapping, direct mapping or set-associative mapping. Illustrative set-associative mapping techniques suitable for use in conjunction with the present invention are described in U.S. patent application Ser. Nos. 10/161,774 and 10/161,874, both filed Jun. 4, 2002 and commonly assigned with the present application, and both of which are incorporated by reference herein.

In general, the multithreaded cache 110 is used to store instructions to be executed by the multithreaded processor 102, while the data memory 112 stores data that is operated on by the instructions. Instructions are fetched from the multithreaded cache 110 by the instruction decoder 116 which operates in conjunction with the register file 118 and the ALUs 120 in controlling the execution of the instructions in a conventional manner. The operation of multithreaded processor elements such as 116, 118 and 120 is well-understood in the art, and therefore not described in further detail herein.

The data memory 112 is typically directly connected to the main memory 104, although this connection is not explicitly shown in the figure.

One or more of the memories 104, 110 and 112 may each be configured so as to include multiple banks or other designated portions. By way of example, each bank may be viewed as being made up of one or more memory modules, or a specified portion of a single memory module.

Techniques for thread-based banking of these and other memories associated with a multithreaded processor are described in the above-cited U.S. patent application Ser. No. 10/269,247, entitled "Method and Apparatus for Thread-Based Memory Access in a Multithreaded Processor."

Techniques for thread-based access to a register file such as register file 118 are described in the above-cited U.S. patent application Ser. No. 10/269,373, entitled "Method and Apparatus for Register File Port Reduction in a Multithreaded Processor."

It should be emphasize that the present invention does not required the particular multithreaded process configuration shown in FIG. 2. The invention can be implemented in a wide variety of other multithreaded process configuration.

A more particular example of multithreaded processor of the type shown in FIG. 2 and suitable for use in conjunction with the present invention is described in U.S. Provisional Application Ser. No. 60/341,289, filed Dec. 20, 2001, the conversion application thereof being the above-cited U.S. patent application Ser. No. 10/269,372, which is incorporated by reference herein. An illustrative embodiment of a multithreaded processor as described in U.S. Provisional Application Ser. No. 60/341,289 is capable of executing RISC-based control code, digital signal processor (DSP) code, Java code and network processing code. The processor includes a single instruction multiple data (SIMD) vector unit, a reduction unit, and long instruction word (LIW) compounded instruction execution.

The present invention in accordance with one aspect thereof provides improved performance in a multithreaded processor such as processor 102 of FIG. 2. More specifically, as will be described in greater detail below, the processor 102 is configured in accordance with the techniques of the invention to utilize a token triggered threading technique which operates in conjunction with instruction pipelining to provide enhanced processor concurrency and reduced likelihood of thread stalling.

Figures 3, 4:
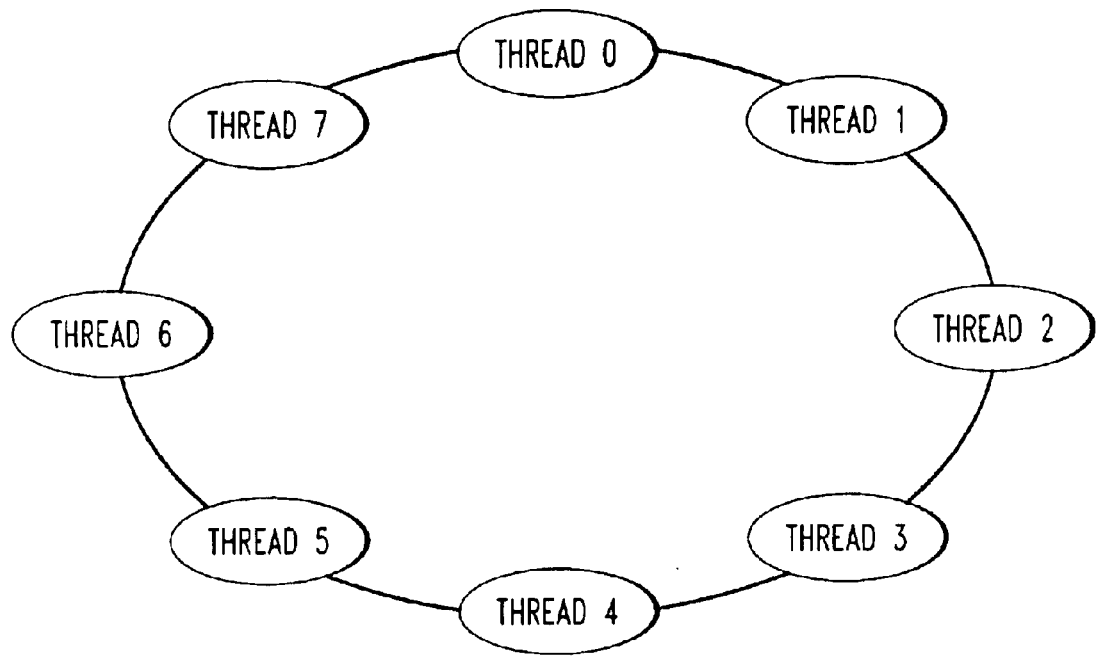
FIG. 3 illustrates an example of token triggered threading suitable for use in the multithreaded processor of FIG. 2 in accordance with the techniques of the invention.
FIG. 4 illustrates the manner in which example instruction functions may be pipelined in the FIG. 2 multithreaded processor in accordance with the techniques of the invention.

FIG. 3 shows an example of token triggered threading for an implementation of processor 102 in which the number of threads N is eight. In general, all of the threads operate simultaneously, and each accesses a corresponding instance of the thread cache 110 and data memory 112. As shown in FIG. 3, the eight threads are denoted Thread 0, Thread 1, Thread 2, . . . Thread 7, and are illustrated as being serially interconnected in the form of a ring. In the multithreaded processor, a given thread can generally be viewed in terms of hardware as well as software. The particular processor hardware associated with a given thread is therefore more particularly referred to herein as a hardware thread unit or simply a "context."

In accordance with the token triggered threading illustrated in FIG. 3, all of the hardware thread units or contexts are permitted to simultaneously execute instructions, but only one context may issue an instruction in a particular clock cycle of the processor. In other words, all contexts execute simultaneously but only one context is active on a particular clock cycle. Therefore, if there are a total of C contexts it will require C clock cycles to issue an instruction from all contexts. Each clock cycle, one of the contexts issues an instruction, and the next thread to issue an instruction is indicated by a token.

In the FIG. 3 example, the tokens are arranged in a sequential or round-robin manner, such that the contexts will issue instructions sequentially. However, tokens indicating the next context to issue an instruction may be arranged using other patterns, such as an alternating even-odd pattern. Also, as noted above, other types of threading may be used in conjunction with the present invention. A number of example threading techniques in accordance with the invention will be described in greater detail below in conjunction with FIGS. 7 and 8.

FIG. 4 illustrates the manner in which example instruction functions may be pipelined in the multithreaded processor 102 in accordance with the present invention. In the illustrative embodiment of the invention, this type of pipelining is preferably utilized in conjunction with the token triggered threading described previously, but it is to be appreciated that numerous other combinations of pipelining and threading may be used in implementing the invention.

The FIG. 4 pipeline is configured for use in conjunction with the illustrative N=8 token triggered threading of FIG. 3. The example instruction functions in FIG. 4 include Load/Store (Ld/St), ALU, integer multiplication (I_Mul) and vector multiplication (V_Mul), and are shown as having nine, six, seven and eight pipeline stages, respectively.

Each of the example instruction pipelines illustrated in FIG. 4 includes at least an instruction decode stage, a register file (RF) read stage, a transfer (Xfer) stage and a writeback (WB) stage. The RF read stage involves reading from a register file, e.g., the register file 118, the transfer stage typically involves transferring instruction results to a designated holding register, and the WB stage involves writing instruction results back to memory or a register file.

The Ld/St pipeline further includes an address generation (Agen) stage, an internal (Int) or external (Ext) determination stage, and three additional memory execute stages, denoted Mem0, Mem1 and Mem2. The Ld/St pipeline thus includes a total of four memory execute stages, that is, Mem0, Mem1, Mem2 and WB. The internal or external determination stage determines if the associated memory access is to an internal or an external memory, and may be viewed as an additional decode stage within the pipeline. It should be noted that additional memory execute stages may be required for certain external memory accesses. For example, if the WB stage of an external memory access does not complete during the period of time for which the corresponding thread is active, the thread may be stalled such that the WB stage will complete the next time the thread is active.

The ALU pipeline further includes two execution stages denoted Exec1 and Exec2.

The integer I_Mul pipeline further includes three execution stages denoted Exec1, Exec2 and Exec3.

The vector V_Mul pipeline further includes two multiplication stages MPY1 and MPY2, and two addition stages Add1 and Add2.

The multithreaded processor 102 is preferably configured such that once an instruction from a particular context enters its corresponding pipeline, it runs to completion.

With an appropriately-configured pipeline and a sufficient number of threads, all hardware contexts may be executing concurrently even though there is only a single instruction issued per context per cycle. As indicated previously, the particular number of threads and pipeline stages are for purposes of illustration only, and not intended to reflect a preferred implementation. Those skilled in the art will be readily able to determine an appropriate number of threads and pipeline stages for a particular application given the teachings provided herein.

A number of examples of the operation of the pipeline of FIG. 4 will now be described with reference to FIGS. 5 and 6. The drawings of FIGS. 5 and 6 each show sequences of instructions issued by particular processor threads, and indicate for each instruction whether an even (e) portion or an odd (o) portion of the register file 118 is utilized by the corresponding thread. The above-cited U.S. patent application Ser. No. 10/269,373, entitled "Method and Apparatus for Register File Port Reduction in a Multithreaded Processor," shows an example of how the register file 118 may be separated into even and odd portions, with a particular one of the portions being selectable utilizing a thread identifier.

Figure 5:
FIG. 5 shows an example single issue pipeline in which each of the threads of the FIG. 2 processor issues one instruction per cycle.

In the examples of FIGS. 5 and 6, it is assumed for simplicity and clarity of description that the number of threads N is equal to 4, and that each thread issues instructions in accordance with a round-robin implementation of the FIG. 3 token triggered threading. More specifically, each thread in these examples issues alternating Load and Vector Multiply instructions, which is a typical instruction sequence in many signal processing applications. The Load and Vector Multiply instructions are configured substantially as described in accordance with the instruction function pipeline shown in FIG. 4.

Referring now to FIG. 5, an example of a single issue pipeline is shown, in which each thread issues one instruction per cycle. It can be seen from the FIG. 5 diagram that the register file portions accessed by the issued instructions alternate from thread to thread between even (e) and odd (o). This ensures that adjacent register writeback operations, such as those associated with the writeback stages of the first Load instruction of Thread 4 and the Vector Multiply instruction of Thread 1, are directed to different portions of the register file. More specifically, the first Load instruction of Thread 4 is directed to an even portion of the register file, while the Vector Multiply instruction of Thread 1 is directed to an odd portion of the register file. The other instructions shown in the diagram are similarly configured.

The thread identifier is used to select whether the even or odd portion of the register file will be accessed by a given thread. For example, in the N=4 case of FIGS. 5 and 6, the least significant bit (LSB) of the thread identifier can be used to select between the even and odd portions of the register file.

FIG. 6 shows an example multiple issue pipeline in which each of the processor threads issues two instructions per cycle. Here, a single thread is issuing both Load and Vector Multiply instructions each cycle. Because multiple instructions issue per cycle, two additional register file read ports are required relative to the FIG. 5 example. However, as can be seen in the diagram, all concurrent writes are still to even or odd portions of the register file, as determined based on the LSB of the thread identifier, so the number of required register file write ports and thus the processor power consumption are reduced.

It should be emphasized that the particular number of threads shown in conjunction with FIGS. 5 and 6 is by way of example only, and the invention is not limited to use with any particular thread number.

Figure 7:
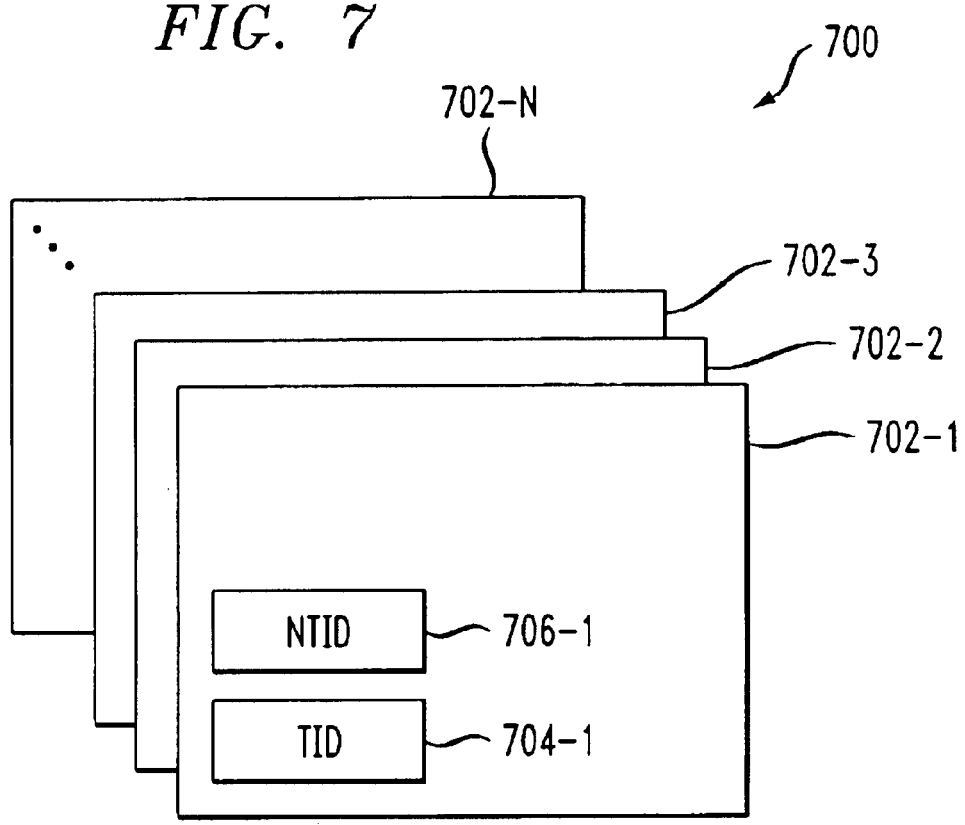
FIG. 7 shows an example set of hardware thread units configured in accordance with the invention and suitable for use in the FIG. 2 processor.

FIG. 7 shows a set 700 of hardware thread units 702-$i$, i=1, 2, . . . N, that may be implemented in the FIG. 2 multithreaded processor 102 in accordance with the invention. As indicated previously, such hardware thread units are also referred to herein as contexts, and there is generally one such unit or context associated with each thread supported by the processor. Each of the hardware thread units 702 includes a thread identifier (TID) register 704 and a next thread identifier (NTID) register 706. In addition, each of the hardware thread units 702 may include a corresponding thread cache 110 and data cache 112, as well as or alternatively associated portions of the cache controller 114 or other processor circuitry.

In accordance with the invention, each of the hardware thread units 702 may issue one or more instructions on a given processor cycle. The TID register 704 in a given hardware thread unit stores the thread identifier of the corresponding thread. The NTID register 706 in the given hardware thread unit stores the thread identifier of the next hardware thread unit that will issue an instruction after the given hardware thread unit has issued its instruction(s). The NTID register 706 thus may be viewed as storing a token associated with a token triggered threading technique of the present invention. The token may be set by the given hardware thread unit to the thread identifier of any of the other hardware thread units, thereby providing considerable flexibility in the token triggered multithreading process.

Although shown in FIG. 7 as a local register associated with and individually programmable by a corresponding hardware thread unit, the NTID register may also or alternatively be implemented as a global register accessible to all of the hardware thread units. In this case, each hardware thread unit need not serially increment the global NTID register. For example, a state machine or other similar circuitry implemented external to the hardware thread units may be used to program a global NTID register to provide any desired token sequence.

Figure 8:
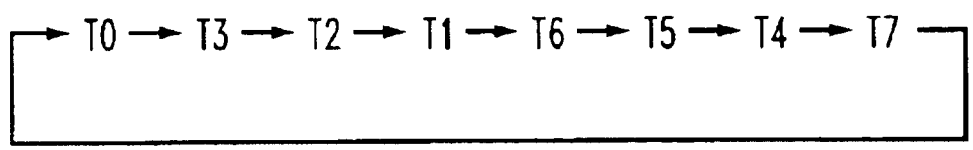
FIG. 8 illustrates a token triggered threading technique implemented in an illustrative embodiment of the FIG. 2 processor.

FIG. 8 shows an example token sequence corresponding to an alternating even-odd pattern. The token sequence in this particular N=8 token triggered threading example is Thread 0 (T0), Thread 3 (T3), Thread 2 (T2), Thread 1 (T1), Thread 6 (T6), Thread 5 (T5), Thread 4 (T4), Thread 7 (T7), Thread 0 (T0), and so on.

This example illustrates that use of the NTID register as shown in FIG. 7 permits each context to grant the token to any other context in an even-odd pattern without causing any conflicts in the execution pipeline, and thus without thread stalls. The combination of this threading technique with instruction pipelining significantly reduces the number of blocking conditions and allows arbitrary execution of even-odd thread sequences.

As noted previously, the thread identifier register 704 stores a multi-bit thread identifier that is used by the multithreaded processor 102 to identify a particular thread. Such thread identifiers may be generated in a conventional manner, as will be apparent to those skilled in the art.

The term "thread identifier" as used herein is intended to include any information suitable for identifying a particular thread or a set of multiple threads in a multithreaded processor. By way of example and without limitation, an n-bit thread identifier may be used to uniquely identify one of $N=2^n$ threads supported by the multithreaded processor. A wide variety of different thread identifier configurations suitable for use with the present invention will be readily apparent to those skilled in the art.

As indicated above, the token triggered threading techniques of the present invention provide significant improvements relative to conventional techniques. For example, the techniques can substantially reduce the likelihood of thread stalling. Moreover, these improvements are provided without impacting processor concurrency or other aspects of processor performance.

The above-described embodiments of the invention are intended to be illustrative only, and numerous alternative embodiments within the scope of the appended claims will be apparent to those skilled in the art. For example, the multithreaded processor configuration, the number of threads, the thread identifier configuration and other parameters of the illustrative embodiments can be varied to accommodate the specific needs of a given application.

What is claimed is:

1. A method for controlling an instruction issuance sequence for a plurality of threads of a multithreaded processor, the method comprising the steps of:

associating with each of the threads at least one register which stores a value identifying a next thread to be permitted to issue one or more instructions; and utilizing the stored value to control the instruction issuance sequence;

wherein the multithreaded processor comprises a plurality of concurrently-executing hardware thread units, each of the hardware thread units being configurable to issue one or more instructions per processor clock cycle for a corresponding one of the threads, the stored value for the corresponding thread indicating, for a given one of the hardware thread units, another of the hardware thread units that will be permitted to issue one or more instructions after the given hardware thread unit has issued one or more instructions, the stored values for the plurality of threads thereby permitting the concurrently-executing hardware thread units to issue instructions in an arbitrary order over consecutive processor clock cycles.

2. The method of claim 1 wherein the associating step further comprises the step of associating with each of a plurality of hardware thread units of the multithreaded processor a corresponding local register updatable by that hardware thread unit, the local register for a given one of the hardware thread units storing a value identifying the next thread to be permitted to issue one or more instructions after the given hardware thread unit has issued one or more instructions.

3. The method of claim 1 wherein the associating step further comprises the step of associating a plurality of registers with each of a plurality of hardware thread units, the plurality of registers comprising for each of the hardware thread units a thread identifier register storing a thread identifier of the corresponding hardware thread unit and a next thread identifier register storing a next thread identifier specifying a next one of the hardware thread units to be permitted to issue one or more instructions.

4. The method of claim 1 wherein the associating step further comprises associating with each of the threads at least one global register accessible to each of the threads, the contents of the global register after instruction issuance by a given one of the threads identifying another of the threads to be permitted to issue one or more instructions in accordance with the instruction issuance sequence.

5. The method of claim 1 wherein the associating and utilizing steps are configured to permit the instruction issuance sequence to correspond to an arbitrary alternating even-odd sequence of threads without introducing blocking conditions leading to thread stalls.

6. The method of claim 1 wherein the at least one register comprises an n-bit register suitable for storing a unique identifier of a given one of $2^n$ threads.

7. The method of claim 1 wherein the at least one register is associated with a thread cache corresponding to the particular thread of the multithreaded processor.

8. The method of claim 1 wherein the value stored in the at least one register comprises a token associated with token triggered threading.

9. The method of claim 8 wherein the token triggered threading utilizes the token to identify in association with a current processor clock cycle a particular one of the plurality of threads that will be permitted to issue an instruction for a subsequent clock cycle.

10. The method of claim 8 wherein the token triggered threading assigns different tokens to each of a plurality of threads of the multithreaded processor.

11. The method of claim 1 wherein the multithreaded processor is configured for pipelined instruction processing.

12. The method of claim 11 wherein the multithreaded processor utilizes an instruction pipeline in which each thread issues a single instruction per processor clock cycle.

13. The method of claim 11 wherein the multithreaded processor utilizes an instruction pipeline in which each thread issues multiple instructions per processor clock cycle.

14. A method for controlling an instruction issuance sequence for a plurality of threads of a multithreaded processor, the method comprising the step of:

associating with each of the threads at least one register which stores a value identifying a next thread to be permitted to issue one or more instructions; and utilizing the stored value to control the instruction issuance sequence;

wherein the multithreaded processor is configured for pipelined instruction processing;

wherein the multithreaded processor utilizes an instruction pipeline in which each thread issues multiple instructions per processor clock cycle; and wherein each of a plurality of the threads issues both a load instruction and a vector multiply instruction in each of a corresponding plurality of processor clock cycles without stalling of any of the plurality of threads.

15. A multithreaded processor comprising a plurality of concurrently-executing hardware thread units and being configured for controlling an instruction issuance sequence for a plurality of corresponding threads of the multithreaded processor, wherein within the processor there is associated with each of the threads at least one register adapted for storing a value identifying a next thread to be permitted to issue one or more instructions, the stored value being utilizable to control the instruction issuance sequence of the processor;

wherein each of the hardware thread units is configurable to issue one or more instructions per processor clock cycle for a corresponding one of the threads, the stored value for the corresponding thread indicating, for a given one of the hardware thread units, another of the hardware thread units that will be permitted to issue one or more instructions after the given hardware thread unit has issued one or more instructions, the stored values for the plurality of threads thereby permitting the concurrently-executing hardware thread units to issue instructions in an arbitrary order over consecutive processor clock cycles.

16. An article of manufacture comprising a machine-readable storage medium having embodied thereon program code for use in controlling an instruction issuance sequence for a plurality of threads of a multithreaded processor, wherein the program code when executed by the processor implements the steps of:

associating with each of the threads at least one register which stores a value identifying a next thread to be permitted to issue one or more instructions; and utilizing the stored value to control the instruction issuance sequence;

wherein the multithreaded processor comprises a plurality of concurrently-executing hardware thread units, each of the hardware thread units being configurable to issue one or more instructions per processor clock cycle for a corresponding one of the threads, the stored value for the corresponding thread indicating, for a given one of the hardware thread units, another of the hardware thread units that will be permitted to issue one or more instructions after the given hardware thread unit has issued one or more instructions, the stored values for the plurality of threads thereby permitting the concurrently-executing hardware thread units to issue instructions in an arbitrary order over consecutive processor clock cycles.

\* \* \* \* \*